United States Patent Office 3,310,520

Patented Mar. 21, 1967

3,310,520
BERYLLIUM OXIDE-ORGANIC RESIN COMPOSITION

Roland T. Girard, Scotia, N.Y., assignor, by mesne assignments, to the United States of America as represented by the Secretary of the Air Force No Drawing. Filed May 24, 1961, Ser. No. 112,178
6 Claims. (Cl. 260—37)

The present invention relates generally to organic resin compositions containing beryllium oxide. More particularly, the present invention relates to organic resin compositions containing dispersed beryllium oxide particles, which compositions are especially suitable for use as adhesives and electrical insulation. Specifically, the invention relates to the combination of an organic resin with beryllium oxide particles, solid unitary products obtained from the combination and methods for the preparation of the solid unitary products. The term "solid unitary product" as used in the specification and claims denotes the final useful form or configuration of the organic resin for a particular application such as films, molded or extruded articles, coatings, fibers, etc.

Conventional solid unitary resin products do not transfer heat readily because of the inherently poor thermal conductivity characteristics of organic resins. The heating of these products must avoid raising the temperature of the resin to a point where thermal degradation or other undesirable results are produced. For example, a metal object coated with an organic resin should not be heated above temperatures that degrade the resin or produce cracks in the resin coating due to differences in thermal expansion between the metal and the resin. Lower temperatures in the resinous portion of a heated product are often achieved by having a good thermal conductor in intimate association with the resin mass. Thus, metal powders have been dispersed in a resin coating and metal inserts employed in large cross-section resin masses to circumvent the problems attendant to heating a solid unitary resin product. Unfortunately, metal conductors and virtually all thermally conductive materials are also electrical conductors which severely limit the useful applications for a resin containing conventional thermal conductors, such as electrically insulating coatings, encapsulation, etc. Another problem associated with the combination of conventional thermally conducting materials and organic resins is chemical interaction during preparation of the product. For example, metallic compounds inhibit the cure of many resins and also catalyze deploymerization at elevated temperatures. It is, therefore, desirable to provide a thermally conducting additive for an organic resin composition which does not degrade the electrical resistance or chemically interact in the product.

It is the principal object of the invention, therefore, to provide an organic resin composition having improved thermal conductivity and useful dielectric characteristics without materially altering the chemical properties of the organic resin.

It is another important object of the invention to provide improved adhesives and electrical insulation from the combination of an organic resin with an inert, thermally conducting dielectric material.

It is still another important object of the invention to provide coating compositions comprising mixtures of at least one liquid organic resin with an inert, thermally conducting dielectric material which are especially useful as adhesives or electrical insulation.

It is still a further important object of the invention to provide a general method for curing liquid compositions of organic resins with an inert, thermally conducting dielectric material to provide smooth continuous films.

These and other objects of my invention will be apparent from the following description.

Briefly, the invention comprises combining beryllium oxide generally in the form of small discrete particles with an organic resin in liquid or solid form to provide a dispersion of the beryllium oxide in the resin. The dispersion of the beryllium oxide in the organic resin may be accomplished in a conventional manner such as by merely mixing solid resin particles with powdered beryllium oxide. A solid unitary product having a good thermal conductivity and dielectric properties is prepared simply by fusing the mixture and allowing it to cool to ordinary temperatures. In another embodiment of the invention, a liquid composition is prepared by dispersing powdered beryllium oxide in a liquid organic resin composition to provide an adhesive or electrical insulation depending upon the characteristics of the organic resin employed. A solid product is obtained from the modified liquid composition by the conventional techniques that are ordinarily employed for the particular resin in the composition. For example, if the liquid composition is a mixture of a liquid epoxy resin with powdered beryllium oxide, the solid product is formed by adding a hardener or cross-linking agent to the liquid composition and curing the admixture at ordinary or moderately elevated temperatures. On the other hand, if the liquid composition comprises an organic liquid solution of a thermoplastic type polymer, such as polystyrene containing beryllium oxide particles, a solid product is obtained simply by removing the liquid solvent through such means as heating or vacuum. Compositions of the invention may contain up to 300 parts beryllium oxide per 100 parts organic resin in the composition without substantially modifying the resinous properties of the polymer. Larger proportions of beryllium oxide in the composition interferes with the integrity of the polymer so that the product formed has more the characteristics of a mass of beryllium oxide particles bonded with the organic polymer. For example, whereas thin continuous films can be deposited from a mixture of 100 parts liquid epoxy resin with 300 parts beryllium oxide, any substantially larger proportion of beryllium oxide retards the flow of the liquid composition and produces discontinuous solid films. The minimum effective concentration of beryllium oxide in the solid product is dictated primarily by the desired thermal conductivity characteristics of the combination and as little as 1 part beryllium oxide per 100 parts organic resin produces a significant increase in thermal conductivity of the product.

Having described the invention generally, the preferred form of the invention can be practiced as illustrated in the following examples and subsequent discussion thereof, but is not limited thereto. Where parts and percentages relating to the compositions of the invention appear hereinafter in the specification and claims, they are parts and percentages by weight unless otherwise specified.

EXAMPLE 1

A liquid coating composition is prepared by mixing 33 parts beryllium oxide having a particle size less than 325 mesh U.S. Screen size with 67 parts of a commercial liquid epoxy resin having an epoxide equivalent in the range 175–210, an average molecular weight of 350–400 and a viscosity at 25° C. between 4,000–10,000 centipoises. A smooth viscous paste is obtained simply by stirring the beryllium oxide into the liquid resin at room temperature. Approximately 8 parts triethylene tetramine hardener is added to the paste to form the final coating composition. The paste was spread on flat aluminum plates and cured at room temperature to yield different thickness continuous films having excellent adhesion to the plates.

The thermal conductivity of the above coatings was measured, using a general procedure described by R. W. Powell in the General Scientific Instruments, 34, 485, December 1957. The test apparatus consisted of two ⅜ inch diameter stainless steel ball bearings mounted 1½ inches apart in an insulated refractory block in such a manner that the balls protruded slightly from one face of the block. A Chromel-constantan differential thermocouple was connected to the steel balls to indicate temperature difference between them during the test. The leads of the thermocouple were attached to a "Millevac" D.C. voltmeter, Type M–27, designed to read from 0 to 250 millivolts in 10 millivolt increments on the most sensitive scale. The test procedure consisted of heating the steel balls mounted in the insulating block to an equal temperature in an oven, removing the heated assembly from the oven and placing each ball simultaneously on a different surface to transfer heat from the balls to the contacting surfaces. One heated ball rested on the epoxy coated aluminum plate during the test measurements and the remaining ball rested on a stainless steel plate. The heat transmission to each surface proceeded in an unequal manner due to the differences in thermal conductivity between the coating of the test plate and the reference standard. The temperature difference due to unequal heating was indicated as a differential E.M.F. by the voltmeter. The difference in thermal conductivity between the materials during the test was measured both on the basis of the time to produce a reading of a specific E.M.F. differential on the voltmeter and by noting the magnitude of the E.M.F. differential at a specific time after initial contact with the heated steel balls.

Measurements made by the above described test indicated that a 10 mil thick coating of the beryllium oxide filled epoxy resin was equivalent in thermal conduction to a 2 mil thick mica sheet, while a 3–4 mil thick film of the beryllium filled epoxy resin coating on aluminum exhibited substantially as good thermal conduction as stainless steel.

EXAMPLE 2

A liquid coating composition is prepared according to the general method of Example 1 with different beryllium oxide and epoxy resin materials. A dense form of beryllium oxide obtained by calcining the beryllium oxide at elevated temperature permits relatively high concentrations of the beryllium oxide in the liquid coating composition without substantial viscosity increase so that thin films can be readily prepared from the composition having higher thermal conduction than compositions containing lesser concentrations of uncalcined beryllium oxide. The beryllium oxide employed in the present embodiment is a commercial material which had been calcined at approximately 1,600° C. and thereafter milled to a particle size in the range 200–325 mesh.

Accordingly, 67.5 parts of the beryllium oxide is mixed with 32.5 parts of a liquid epoxy resin and 4.5 parts triethylene tetramine. The epoxy resin has an epoxide equivalent in the range 175–210, an average molecular weight of 340–400 and a viscosity at 25° C. of 500–900 centipoises. The thermal conductivity of the aluminum plates coated with 10 mil thick coatings of the above composition was about four times the thermal conductivity of like samples prepared with the composition of Example 1. Three mil thick coatings of the present composition exhibited better heat conduction than stainless steel.

Dielectric measurements were also made on 3 mil thick solid films prepared from the above composition to determine the suitability of a beryllium oxide filled organic resin for electrical insulation. The volume resistivity of the samples was measured with a Keithley Electrometer at 100 volts D.C. using 1-inch diameter aluminum foil electrodes. The volume resistivity at 50% relative humidity and 23° C. measured 7.1 x $10^{11}$ ohm centimeters. Volume resistivity at 80° C. and 50% relative humidity measured at least 1.0 x $10^{9}$ ohm centimeters. An additional measurement was made on the sample after a 9-hour exposure to 100% relative humidity at 23° C. Measurement was made by removing the sample from the 100% relative humidity chamber, immediately applying the test voltage, and taking a reading one minute after the voltage had been applied. The volume resistivity under these conditions at 23° C. was 2.6 x $10^{9}$ ohms centimeters. Power factor and dielectric constant measurements were also made on the films in a conventional manner at a frequency of 60 cycles per second. At 50% relative humidity and 23° C., the power factor measured 5.5 and the dielectric constant measured 6.3. The dielectric strength of the film at 23° C. averaged 833 volts per mil for three samples. From the test results, it can readily be seen that the beryllium oxide filled compositions of the invention easily meet the dielectric requirements for general purpose electrical insulation.

EXAMPLE 3

Additional thermal conductivity measurements were made on representative beryllium oxide filled organic resin compositions of the invention for comparison with other organic resin compositions containing conventional filler materials. The compared compositions all comprised cured epoxy resin products having various metals, beryllium oxide, or other amphoteric oxides uniformly dispersed therein.

A one-inch diameter disc of the composition to be tested was inserted in a heat transfer apparatus so that the test disc was located between two reference discs of material with known conductivity. A hot plate in contact with the outside surface of one reference disc supplied heat to the assembled discs and the heat was conducted through the assembly to a heat sink maintained at a temperature below ambient in contact with the outside surface of the other reference disc. The temperature gradient through each disc was determined from values of temperature obtained by means of thermocouples in contact with the surface of each disc. Convection losses were minimized during the test by immersing the entire assembly in powdered insulating material and tests were made at several different heat flow rates to insure reliability of the results. The beryllium oxide filled organic resin samples tested were obtained by casting a liquid mixture of the constituents into a mold having the dimensions of the test disc and curing the casting at room temperature. The composition of the liquid mixture comprised 71.25 parts beryllium oxide calcined at 1750° C. and milled to a 200–325 mesh particle size, 28.75 parts liquid epoxy resin of Example 2, and 4 parts methyl Nadic anhydride. The liquid composition poured easily and had a pot life of approximately 2 days. Thermal conductivity samples containing other fillers were prepared in a like manner employing the same epoxy resin curing system.

The results of the thermal conductivity measurements are contained in Table 1 below along with the compositions of the particular products tested.

*Table 1*

| Test Composition (Vol. percent): | Thermal Conductivity in cal./sec./cm.²/°C./cm. |
|---|---|
| Epoxy resin 100 | 0.0006 |
| Epoxy 80, silica 20 | 0.0011 |
| Epoxy 60, silica 40 | 0.0020 |
| Epoxy 50, silica 50 | 0.0027 |
| Epoxy 42, silica 58 | 0.0036 |
| Epoxy 52, alumina 48 | 0.0034 |
| Epoxy 50, beryllia 50 | 0.0055 |
| Epoxy 70, iron 30 | 0.0022 |
| Epoxy 55, aluminum 45 | 0.0039 |
| Epoxy 40, copper 60 | 0.0039 |

From these results it will be apparent that a beryllium oxide filled resin composition possesses better thermal conductivity than organic resin compositions containing either metals or other amphoteric oxides.

EXAMPLE 4

To illustrate still further compositions within the contemplation of the invention, beryllium oxide is added to various thermoplastic resin formulations to prepare products which are especially suitable for electrial insulation. For example, 15 parts beryllium oxide is mixed at room temperature with 100 parts of a typical vinyl chloride polymer plastisol to yield an insulating composition for electrical wire or cable having improved thermal conductivity. Vinyl chloride polymer plastisols are commercially available and a suitable plastisol for use in the invention comprises 50 parts of a vinyl chloride paste resin such as Geon 121, a product of B. F. Goodrich Co., 25 parts dioctyl phthalate plasticizer, 23 parts of a linear polyester polymeric plasticizer, and 2 parts of an alkyl aryl phosphite stabilizer. A different vinyl chloride polymer composition comprising a solid mixture of a granular vinyl polymer with beryllium oxide can be extruded to form wire insulation or molded into encapsulation for electrical devices. A typical molding composition comprises 100 parts of a high molecular weight vinyl chloride polymer, 50 parts di-2-ethylhexyl phthalate, and 15 parts powdered beryllium oxide. The insulation possesses improved thermal conductivity compared to compositions containing like amounts of metal or other amphoteric oxides.

The preferred compositions for the practice of the invention are uniform mixtures comprising 100 parts liquid polyepoxide resin, an effective amount of a curing agent, and up to 300 parts powdered beryllium oxide based on the weight of the resin in the composition. The preferred compositions are especially useful for adhesive and electrically insulating applications and can be cured at room temperature or only moderately elevated temperatures. Many of the preferred mixtures flow easily and have a low enough viscosity to release trapped air bubbles so that the mixtures are especially suitable for encapsulation of electrical devices.

The polyepoxide resins useful in the preferred compositions of the invention can be characterized generally by the reactive epoxy or ethoxyline group

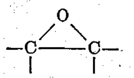

so as to be cross-linkable by reaction with the curing agent. The most common polyepoxides contain reactive epoxy groups at both ends of the polymer chain and have hydroxyl groups spaced at regular intervals along a chain that serve as additional cross-linking sites in the cure reaction. The liquid polyepoxides are generally the condensation products of an excess epihalogenohydrin, such as, epichlorohydrin with a phenol having at least two phenolic hydroxy groups, for example, 2,2-bis(hydroxyphenyl) propane. The commercially available liquid resins are generally a complex mixture of reaction products, the principal product being represented by the following general formula:

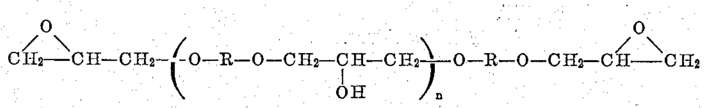

wherein R represents the divalent hydrocarbon radical of the dihydric phenol and $n$ has an average value range from about 0–7. As shown in the above general formula, useful polyepoxide resins will contain both hydroxyl and epoxide groups with the number of epoxide groups generally being limited to 2 whereas the number of hydroxyl groups being equal to the number of $n$ groups. Typical commercial liquid resins within the above general formula are obtained by reacting epichlorohydrin with 2,2-bis(hydroxyphenyl) propane, the resinous reaction products having an epoxide content in the range 175–290 and being liquid at temperatures of about 28° C. and higher. While it is preferred that liquid polyepoxide resins contain a plurality both of the reactive hydroxyl and epoxide groups for greater reactivity with curing agent, it is believed that adequate crosslinking can be obtained for polyepoxide resins having a single epoxide and reactive hydroxyl group. As substitutes for the 2,2-bis(hydroxyphenyl) propane reactant useful in the preparation of liquid polyepoxide resins there may be employed other polyhydric phenols including resorcinol, 2,2-bis(hydroxyphenyl) butane as well as various trisphenols. In addition, polyhydroxy compounds such as certain glycols or glycerols may be reacted with an epihalogenohydrin in the presence of a suitable catalyst and the product converted to yield the polyepoxide resin. Equivalents for the epichlorohydrin reactant, that may be substituted, are poly-functional alcohol-contributing epihalogenohydrins such as epibromohydrin, epihalogenohydrins of manitol, sorbitol, erythritol, etc., as well as polyhalogenohydrins such as glycerol dichlorohydrin, betamethyl glycerol dichlorohydrin, manitol or sorbitol dichlorohydrin, etc. Other epoxide polymers yielding tough solid products include certain epoxylated materials containing reactive hydroxyl groups such as epoxylated novalacs, epoxylated natural oils, etc.

From the foregoing description, it will be apparent that a general method for increasing the thermal conductivity of an organic resin without degrading the dielectric characteristics of the resin has been provided. Furthermore, novel liquid compositions have been shown which are especially suitable for adhesive and electrical insulating applications. It is not intended to limit the invention to the preferred embodiments above shown, however, since it will be obvious to those skilled in the art that certain modifications of the present teaching can be made without departing from the true spirit and scope of the invention. For example, the combination of beryllium oxide with certain elastomeric organic resins such as isoprene and polyurethanes provides compositions having improved suitability for rubber mechanical goods. Specifically, the improved heat conductivity of these combinations will extend the life of such articles as tires or resilient metal bushings which are often degraded primarily by heat buildup. It is intended to limit the present invention, therefore, only to the scope of the following claims.

What I claim as new and desire to secure by Letters Patent of the United States is:

1. A mixture comprising 100 parts liquid polyepoxide which is the reaction product of an epihalogenohydrin with a dihydric phenol having the general structure

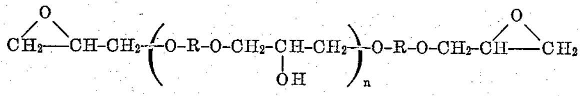

where R represents the divalent hydrocarbon radical of the dihydric phenol, and $n$ is an integer from 0 to about 7, with an effective amount of a curing agent and from about 1 to 300 parts powdered calcined beryllium oxide based on the weight of the polyepoxide.

2. A mixture comprising 100 parts liquid polyepoxide which is the reaction product of an excess of an epihalogenohydrin with a dihydric phenol having the general structure

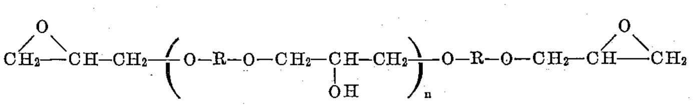

wherein R represents the divalent hydrocarbon radical of the dihydric phenol and $n$ is an integer from 0 to about 7, with an effective amount of a curing agent and from about 1 to 300 parts powdered calcined beryllium oxide based on the weight of the polyepoxide.

3. A mixture comprising 100 parts liquid polyepoxide which is the reaction product of an excess of an epichlorohydrin with 2,2-bis(hydroxyphenyl) propane having the general structure

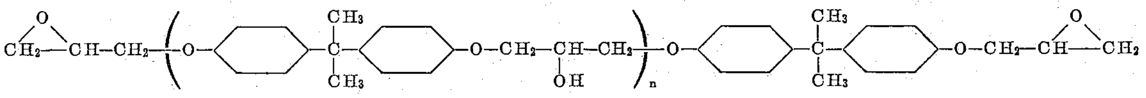

wherein $n$ is an integer from 0 to about 7 with an effective amount of a curing agent and from about 1 to 300 parts powdered calcined beryllium oxide based on the weight of the polyepoxide.

4. A mixture comprising 100 parts liquid polyepoxide which is the reaction product of an excess amount of epichlorohydrin with 2,2-bis(hydroxyphenyl) propane having the general structure

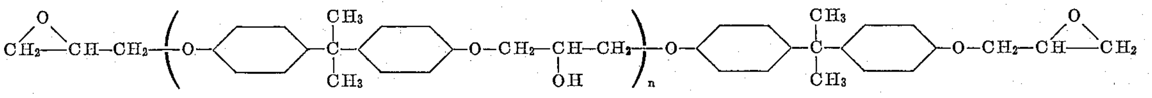

wherein $n$ is an integer from 0 to about 7, with an effective amount of methyl nadic anhydride and from about 1 to 300 parts powdered beryllium oxide based on the weight of the polyepoxide.

5. The unitary solid cured product of a mixture comprising 100 parts liquid polyepoxide which is the reaction product of an epihalogenohydrin with a dihydric phenol having the general structure

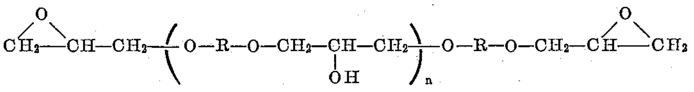

wherein R is the divalent hydrocarbon radical of a dihydric phenol and $n$ is an integer from 0 to about 7, with an effective amount of a curing agent and from about 1 to 300 parts of powdered beryllium oxide based on the weight of the polyepoxide.

6. An electrical conductor coated with the cured solid product of a mixture comprising 100 parts liquid polyepoxide which is the reaction product of an epihalogenohydrin with a dihydric phenol having the general structure

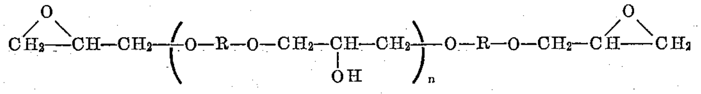

wherein R represents the divalent hydrocarbon radical of the dihydric phenol and $n$ is an integer from 0 to about 7, with an effective amount of a curing agent and from about 1 to 300 parts of powdered beryllium oxide based on the weight of the polyepoxide.

References Cited by the Examiner

UNITED STATES PATENTS

| | | | |
|---|---|---|---|
| 2,734,344 | 2/1956 | Lindenblad | 136—4.2 XR |
| 2,773,048 | 12/1956 | Formo et al. | 260—37 |
| 2,788,337 | 4/1957 | Preiswerk et al. | 260—47 XR |
| 2,948,930 | 8/1960 | Herbst. | |
| 3,014,893 | 12/1961 | Susman et al. | 260—37 |
| 3,018,264 | 1/1962 | Colclough | 260—37 |
| 3,039,987 | 6/1962 | Elbling. | |
| 3,067,048 | 12/1962 | Gion | 106—58 |

OTHER REFERENCES

Lee et al. "Epoxy Resins," McGraw-Hill, 1957, pages 117 and 134 cited.

MORRIS LIEBMAN, *Primary Examiner.*

MILTON STERMAN, *Examiner.*

T. D. KERWIN, A. H. KOECKERT, *Assistant Examiners.*